Dec. 27, 1960    A. D. JAIRETT    2,965,956
HINGE BOND CONSTRUCTION
Filed June 25, 1956    4 Sheets-Sheet 2

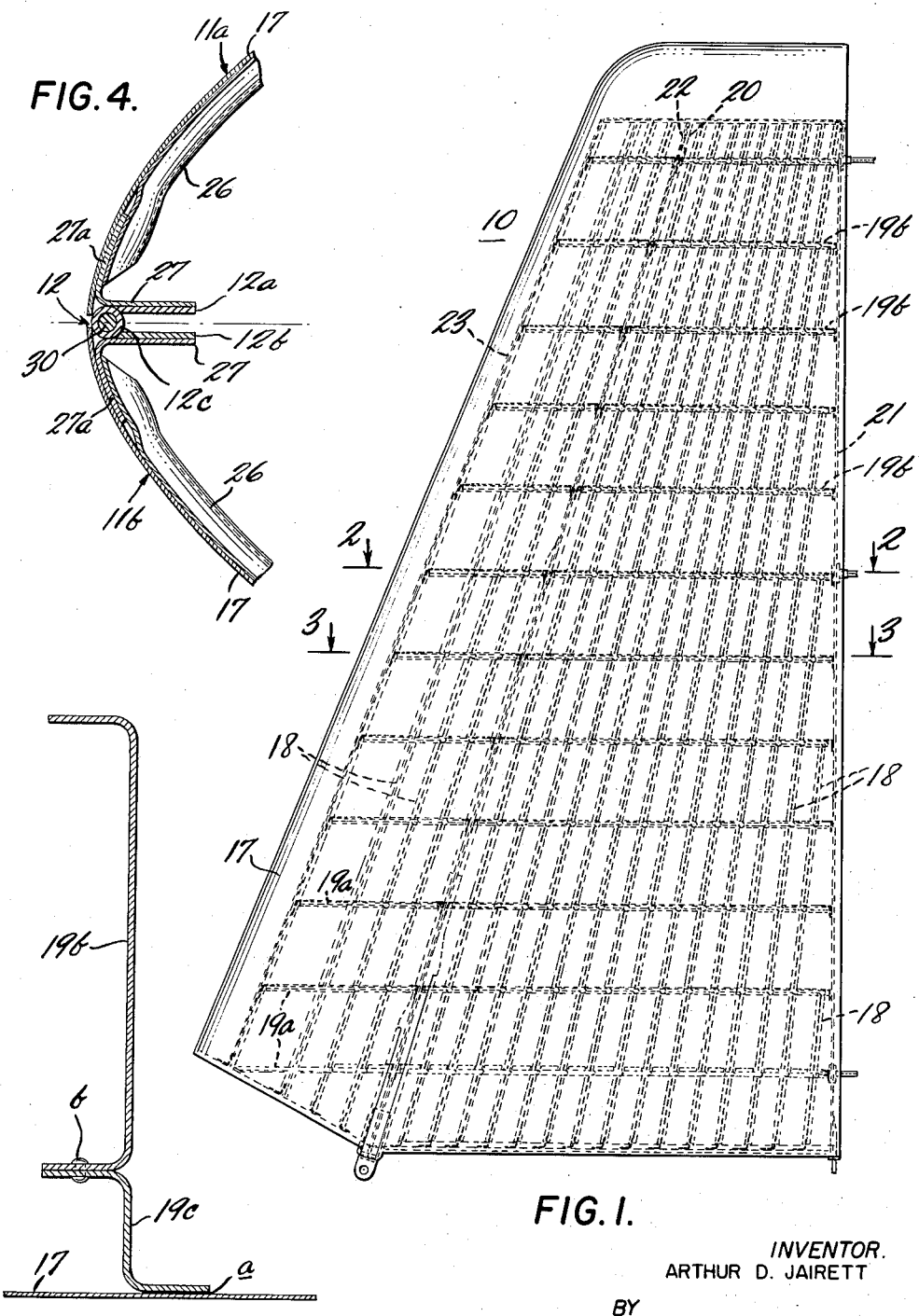

INVENTOR.
ARTHUR D. JAIRETT
BY
*Campbell, Brumbaugh, Free & Graves*
*his* ATTORNEYS.

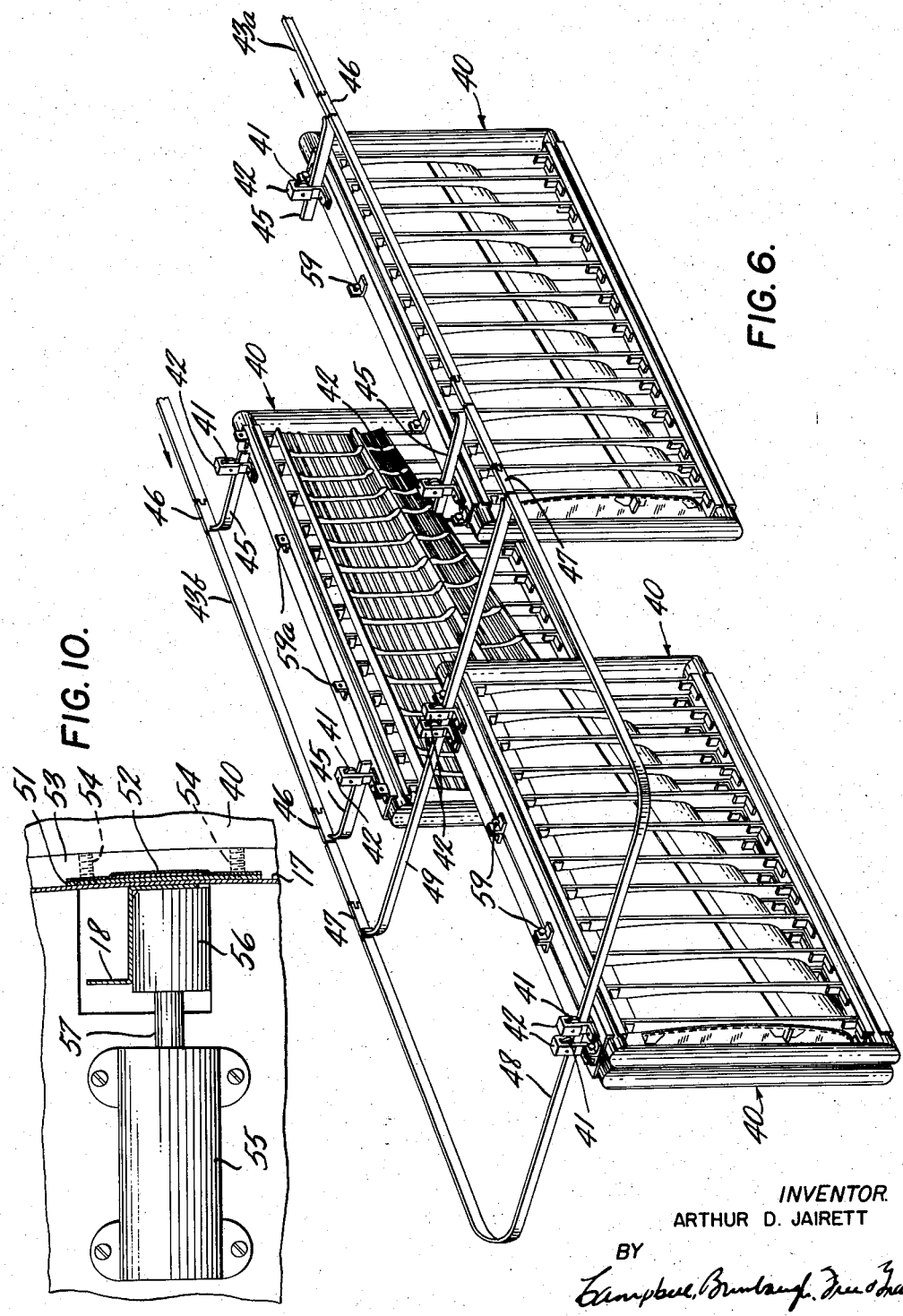

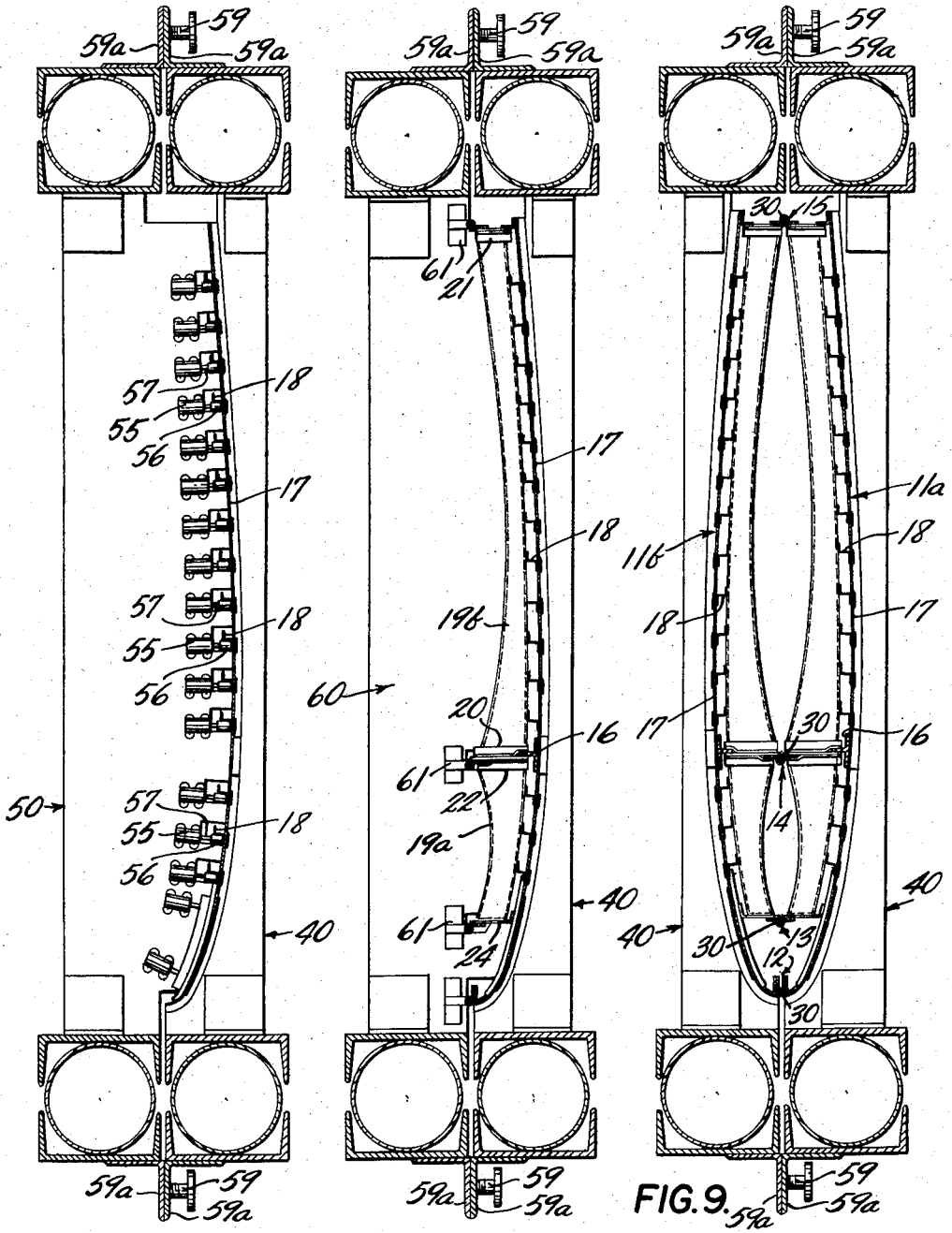

United States Patent Office 2,965,956
Patented Dec. 27, 1960

2,965,956

HINGE BOND CONSTRUCTION

Arthur D. Jairett, Waynesboro, Pa., assignor to Fairchild Engine and Airplane Corporation, Hagerstown, Md., a corporation of Maryland Filed June 25, 1956, Ser. No. 593,480

5 Claims. (Cl. 29—200)

This invention relates to improvements in structures, such as airfoil structures, which may be built in separate sections and thereafter assembled as a unit. More particularly, the invention relates to the means and method for assembling the separate sections.

In the application of the present invention to the construction of airfoil structures, half sections of the airfoil structure are put together in separate master jigs. The master jigs are each advanced along overhead rails from one station to another in sequence, at which stations the internal framework and skin are assembled. Side rails are provided at each station, and switching means are utilized to transfer the jig from the main rail to the side rails. Ultimately the two jigs are brought together at a final stage of the assembly operation so that the two sections may be joined permanently together.

It is evident that welding or riveting would be impractical for joining the airfoil sections together, primarily due to the fact that there is no access to the interior of the airfoil structure at this final meeting inasmuch as the sections have been completely assembled prior thereto. For the final step in the assembly of joining the two sections together, the present invention utilizes a hinge type interlocking construction. Accordingly, each of the half sections is provided with intermeshing members having openings or eyelets therein which are aligned with respect to a common axis, so that the final step of joining the sections together is accomplished by inserting a long pin through the aligned openings thereof. When the hinge pin is thus secured in place, the airfoil sections will be effectively and permanently joined together.

The present invention, therefore, provides a means and method for fabricating structures, including airfoil structures, of an airplane wherein close tolerances must be preserved, in sections and for quickly and conveniently joining the sections at a final stage of assembly, notwithstanding the fact that there is virtually no access to the interior areas when the sections are brought together.

For a complete understanding the present invention, reference may be had to the detailed description which follows and to the accompanying drawings wherein:

Figure 1 is an elevation view of a typical structure, namely, a tail of an airplane, constructed in accordance with the present invention;

Figures 2 and 3 are cross-section views taken substantially along the lines 2—2 and 3—3 of Figure 1, looking in the direction of the arrows;

Figure 4 is a greatly enlarged cross-section view of the forward end of the airfoil structure;

Figure 5 is a cross-section view taken along the line 5—5 of Figure 2 looking in the direction of the arrows;

Figure 6 is an isometric view illustrating the conveyor system utilized in the practice of the present invention;

Figures 7, 8 and 9 are cross-section views illustrating the various steps of the construction of a half section within one of the jigs; and Figure 10 is an enlarged view of a portion of the apparatus shown in Figure 7.

Figure 3:
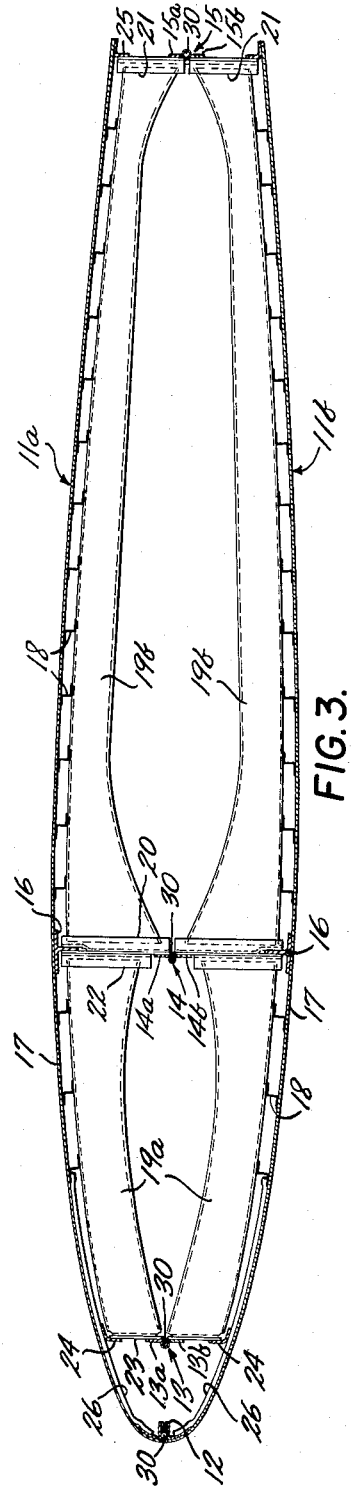
Figure 2:
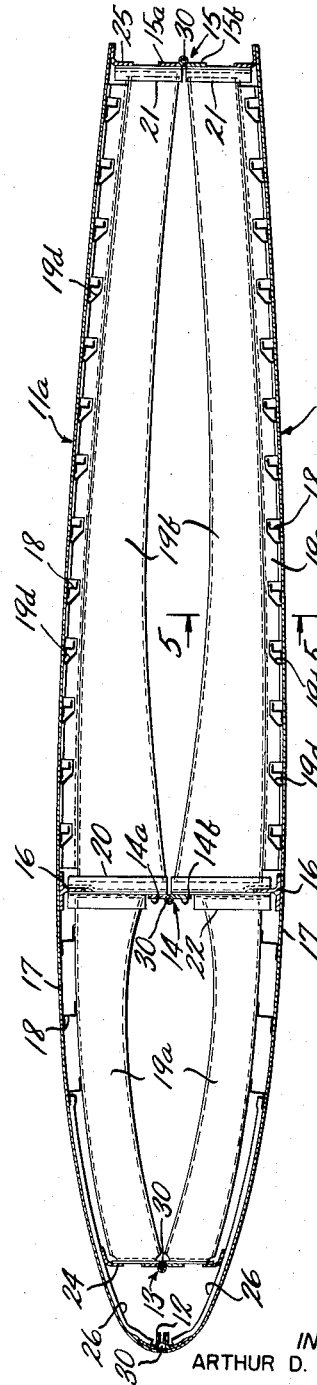

Figures 1 to 5 of the drawings illustrate a typical airplane tail assembly 10 of the present invention which is constructed by joining together half sections 11a and 11b by interlocking means 12, 13, 14 and 15.

Each of the sections 11a, 11b includes an outer skin 17, a plurality of vertically disposed stiffening members or "stringers" 18, and a plurality of horizontally disposed ribs 19a, 19b. The stringers 18 are welded directly to the inner surface of the skin 17, and the ribs 19a, 19b are riveted to the stringers. Some of the ribs 19b (see Figures 2 and 5) are also riveted to ribs 19c which extend parallel to the ribs 19b and are disposed between the skin 17 and the ribs 19b. The ribs 19c include slots 19d (see Figure 2) which overlie and accommodate the stringers 18. As shown in Figure 5, the ribs 19c are welded to the inner surface of the skin 17 at a, and the ribs 19b are attached to the ribs 19c by rivets b.

The ribs 19a are forward of the ribs 19b, and the ribs 19a extend between rear and front spars 22, 23, respectively. The ribs 19b extend between the front and rear spars 20, 21, respectively. The spars 20 and 22 of each of the half sections 11a, 11b are connected back to back, and the ends of the spars 20, 22 adjacent the skin 17 are attached thereto by rigid beams 16. As shown in Figure 3, beams 24, 25 anchor the ends of the spars 23, 21, respectively, to the skin 17.

The nose or forward end of each of the sections 11a, 11b of the tail assembly 10 is reinforced by a corrugated inner skin 26 (see Figure 4). Bent flanges 27a of parallel beams or plates 27 are wedged between the inner and outer skin 17, 26, respectively. When the sections 11a, 11b are brought together properly for joining, the beams 27 of the two sections are disposed in parallel spacially separated relationship, and these beams 27 serve as supports for a plurality of hinge plates 12a, 12b, each formed with an eyelet 12c. The hinge plates 12a are carried by the section 11a, and these hinge plates are in staggered, closely-fitting relationship to the hinge plates carried by the complementary section 11b. Consequently, when the two sections 11a, 11b are brought together properly, the eyelets 12c of the staggered hinge plates 12a, 12b are aligned along a common axis with no or very little clearance therebetween. These aligned eyelets 12c are adapted to receive a long hinge pin 30 which is inserted therethrough and secured therein to permanently lock the sections 11a, 11b together.

The spars 23, 20 and 21 are similarly joined together by the interlocking means 13, 14 and 15, respectively. More specifically, the spars 23 of the sections 11a and 11b carry hinge plates 13a and 13b, respectively, the eyelets of which are offset relative to each other so as to be aligned when the sections are brought together properly to receive a long locking pin 30. Likewise, locking pins 30 join together offset hinge plates 14a and 14b of the spars 20 of the sections 11a and 11b, respectively, and hinge plates 15a and 15b of the spars 21 of the sections 11a and 11b, respectively.

Thus, by way of summary, the tail assembly 10 shown in Figures 1 to 5, inclusive, is constructed in separate half sections 11a and 11b. The framework of each of the sections is provided with several series of staggered locking devices having openings therein which, when the sections are brought together for final joining, will be intermeshed and be aligned along a common axis. The joining operation consists merely of inserting a long pin through each series of locking devices. After the pins have been inserted, they can be permanently secured therein at their ends, if so desired.

As mentioned above, the staggered hinge plates should be constructed with a minimum of clearance therebetween so that stresses can be transmitted thereby.

Although the assembly has been shown and described particularly with reference to a tail assembly for an airplane, it is, of course, understood that the invention is applicable also to airfoil structures generally, including wings, missile bodies, fuel tanks, floats, and the like.

The construction of the assembly can be best explained with reference to Figures 6 to 10, inclusive. The sections 11a, 11b of the structure 10 are each assembled in a separate master jig 40. The master jigs 40 are each equipped with at least two rollers 41, each rotatably mounted in a housing 42 pivotally mounted above the jig. The jigs are suspended by means of the rollers 41 from overhead rails 43a, 43b.

The section 11a of the tail structure is assembled in a jig moving along one of the rails 43a, 43b, and the section 11b is assembled in a jig moving along the other of said rails. The rails 43a, 43b run parallel to each other, and at spaced intervals along each of the main rails 43a, 43b, pairs of side rails, for example the rails 45, lead off from the main rail for removing the jigs from the main rail for the performance of particular operations. A plurality of such stations may be provided along each of the main rails 43a, 43b.

The rails 45 lead away from the main rails 43a, 43b, but the receiving ends of the rails 45 are curved to facilitate the removal of the jigs from the main rails. The main rails are provided with pivoted switches 46, the positions of which determine whether the jig will be sidetracked to the rails 45 or will advance along the main rails 43a, 43b toward a common terminal for the final joining operation.

At the end or terminal of the assembly line, the rails 43a, 43b are connected by a transverse rail 48. Another transverse rail 49 is spaced apart from the rail 48 and extends parallel thereto, and pivoted switches 47 determine whether the rollers conveying the jig will travel on to the rail 48 or the rail 49. It is evident that if the respective switch 47 is shifted toward the rail 49 after the leading end of the jig has been advanced past the switch, a jig can be transferred from either of the rails 43a, 43b to the transverse rails 48, 49. In this way, the jigs in which the sections 11a and 11b have been assembled can be brought together to bring the sections 11a, 11b into mating contact for the final joining operation.

In Figure 6 only the final stages of the assembly line are shown. However, it is understood that, depending on the number of operations to be performed in assembling of a particular section, a great many such side rails, like the rails 45, can be provided. At some stations it will be convenient to mount the equipment employed in a complementary jib supported by the side rails 45. In this way, a jig 40 in which the section is assembled can be brought together with the jig carrying the equipment for particular operations.

The steps and equipment employed in the assembly of the tail section 11a and the final joining of the sections 11a and 11b are illustrated in Figures 7 to 10, inclusive. In the assembly of the section 11a, the outer skin 17 is first securely bolted through pre-drilled rivet holes to the jig contour form, and thereafter the stringers 18 are bonded directly to the skin. In Figure 7, the master jig 40 is illustrated with the outer skin 17 securely fastened to the contour form, and the master jig 40 is shown locked in abutting relationship with a stationary pressure jig 50 which carries the apparatus employed in welding of the stringers to the inner surface of the skin 17. The jigs 40, 50 are locked together by any suitable means, such as by threaded screws 59 which join together flanges 59a of the respective jigs.

To facilitate the bonding of the stringers to the skin, it has been found feasible to equip the master contour form 53 (see Figure 10) of the jig 40 with an aluminum heating conducting strip 51 and an electrical resistance heating tape 52 at all areas where bonding of the skin to the stringer is to occur. Preferably, the master contour form 53 of the jig 40 is constructed of an insulating material such as fiberglass. The metal strip 51 is held in place against the contoured fiberglass backing 53 by screws 54. When the jig 50 is moved into place, the portion of the stringer 18 to be bonded to the skin 17 is held in place against the surface to which it is to be bonded by pressure pads 56 moved into pressure contact with the stringers 18 by the forward stroke of pistons 57 of air cylinders 55 accommodated in the stationary jig 50. The tapes 52 are then electrically heated to bond the stringers to the skin.

At still another station, the jig 40 is moved into abutting contact with a structure jig 60 (see Figure 8) wherein the framework, including the ribs 19a, 19b and the spars 20, 21, 22 and 23, have been previously assembled as a unit. After the beams 16, 24 and 25 have been welded in place, this framework is riveted to the stringers 18 and spacer ribs 18a to complete the assembly of the half section. Preferably, shims are interposed between the stringers and ribs. At the completion of this operation, the angle beams 27 and inner skin 26 are installed in the nose portion of the structure, and the hinge plates 12a, 13a, 14a and 15a are set in place after all structural riveting has been completed.

At the final stage of assembly, the two jigs 40 accommodating the mating sections 11a, 11b are brought together for final joining (see Figure 9). When properly assembled and brought together, the hinge plates 12a, 13a, 14a and 15a of the section 11a interlock with the companion hinge plates 12b, 13b, 14b and 15b of the section 11b. As mentioned above, the two sets of hinge plates are mounted respectively in staggered fashion so that when they are brought together the eyelets of the various hinge plates are aligned with respect to a common axis. The final step in the assembly is the insertion of the locking pins 30 through the aligned eyelets of the hinge plates. The pins are sufficiently long so that a single hinge pin will extend the entire length of the tail structure. Finally, the pins may be secured therein in any suitable manner, for example, by flattening the ends thereof, to prevent their withdrawal. When the pins are so secured, the half sections are permanently joined together.

The invention has been shown in a single preferred form and by way of example only. Obviously many modifications may be made therein without departing from the spirit of the invention. The invention, therefore, is not to be limited to any specified form or embodiment except in so far as such limitations are set forth in the appended claims.

I claim:

1. Apparatus for making and assembling complementary sections of a structure comprising at least two jig frames in which the complementary sections are built, each jig frame having a leading guided means and a trailing guided means, means for guiding both the leading and trailing guided means of each jig frame for movement along an assembly line in which the complementary section is built, and a pair of terminal guiding means extending between the two assembly line guiding means for bringing a pair of the jig frames together in face-to-face relationship for assembly of the complementary sections, the pair of terminal guiding means being operatively spaced apart to permit one to receive a leading guided means and the other to receive a trailing guided means of a jig frame from each assembly line guide means.

2. Apparatus for making and assembling complementary sections of a structure comprising at least two jig frames in which the complementary sections are built separately in different assembly lines, tracks for guiding each of the jig frames endwise in a vertical plane through the respective assembly line, leading and trailing track followers carried by each jig frame, both followers being engageable with the same assembly line track, and a pair of terminal tracks joining a pair of assembly line tracks for bringing the jig frames together in face-to-face relationship for the assembly of the two complementary sections, the pair of terminal tracks being operatively spaced apart to permit one to receive the leading follower and the other to receive the trailing follower of a jig frame from each assembly line track.

3. Apparatus for handling complementary sections of a structure during assembly comprising at least two jig frames in which the complementary sections are built, assembly line guide means for guiding each jig frame for movement endwise in a vertical plane along an assembly line in which the respective complementary section is built, leading and trailing guided means carried by each of the jig frames and cooperating with the respective assembly line guide means for guiding the jig frame, a pair of terminal guide means extending from one assembly line guide means to the other for bringing the jig frames together in side-by-side relationship to facilitate assembly of the complementary sections; and switch means at both ends of the terminal guide means first to be encountered by the leading guided means, whereby when the switch means is open a guided means passes by the terminal guide means first to be encountered permitting the guided means to continue on to the other terminal guide means, the pair of terminal guide means being operatively spaced apart to permit one of the terminal guide means to receive the leading guided means and the other terminal guide means to receive the trailing guided means.

4. Apparatus as set forth in claim 3 including a pair of side guide means operatively spaced apart to receive the leading and trailing guided means of a jig frame, said side guide means being upstream of the assembly line guide means from the terminal guide means, and switch means connecting each of the side guide means with the respective assembly line guide means to permit a jig frame to be side-tracked from the assembly line guide means.

5. Apparatus for making and assembling complementary sections of a structure comprising at least two jig frames in which the complementary sections of the structure are built, an overhead assembly line rail for conducting each of the jig frames endwise in a vertical plane through an assembly line in which the respective complementary section is built, leading and trailing rail guided means carried by each jig frame, both leading and trailing rail guided means being engageable with said overhead assembly rail and movable with respect thereto for guiding the respective jig frame endwise, an overhead terminal rail connecting the extreme ends of different assembly line rails, an overhead terminal rail parallel to said first-mentioned overhead terminal rail and extending between said different overhead assembly tracks upstream of the ends thereof, the two overhead terminal rails being spaced apart to permit one to receive a leading rail guided means and the other to receive a trailing rail guided means, and switch means connecting both ends of the said second-mentioned overhead terminal rail with different assembly line rails, whereby the two jig frames are movable endwise along the respective assembly line rails during the construction of the respective complementary section and the jig frames are brought together in face-to-face relationship for assembly of the two complementary sections by in each case advancing the leading rail guided means of the jig frame into engagement with the first-mentioned overhead terminal rail while the switch means to the second-mentioned overhead terminal rail is open, and thereafter guiding the trailing rail guided means of the jig frame into engagement with the second-mentioned overhead terminal rail while the switch means is closed.

References Cited in the file of this patent

UNITED STATES PATENTS

| | | |
|---|---|---|
| 994,124 | Colahan | June 6, 1911 |
| 1,402,558 | Weber et al. | Jan. 3, 1922 |
| 1,772,735 | Romine | Aug. 12, 1930 |
| 2,301,636 | Nicol | Nov. 10, 1942 |
| 2,314,319 | Smith | Mar. 16, 1943 |
| 2,405,544 | Anjeskey | Aug. 13, 1946 |
| 2,558,819 | Chausson | July 3, 1951 |
| 2,563,218 | Darracott et al. | Aug. 7, 1951 |
| 2,779,092 | Gordon | Jan. 29, 1957 |